United States Patent Office 3,159,481
Patented Dec. 1, 1964

3,159,481
BRAZING ALLOY COMPOSITION AND METHOD
FOR MAKING SAME
John R. Horrigan, Champaign, Ill., and William T. Kaarlela, Fort Worth, Tex., assignors to General Dynamics Corporation (Convair Division), San Diego, Calif., a corporation of Delaware
No Drawing. Filed Dec. 24, 1959, Ser. No. 861,770
3 Claims. (Cl. 75—173)

This invention relates to the brazing of metals and more particularly to the provision of an improved brazing alloy of adequate strength and corrosion resistance for brazing such metals as titanium or stainless steel, and the method of making the brazing alloy.

In modern high speed aircraft, structures having a high strength to weight ratio are desired. One such structural development is in the use of honeycomb-core sandwich panels wherein a honeycomb-core material is machined to the desired contour and depth, with a skin brazed to the upper and lower surfaces. The core material may consist of 3/16 inch square vented cells made from 0.0015 inch thick foil, for example, with the nodes resistance welded. The thickness of the surface skins will vary with the location and function of the panel. Skins exposed to the airstream generally range from 0.008 to 0.012 in. thick, but the thickness may be as high as 0.062 in. in heavily loaded panels, such as in the nacelle struts. For inner skins not exposed to the airstream, the skin thickness is 0.005 to 0.008 inch. The minimum allowable test strengths for a brazed panel, based on a one-half inch thick specimen are: 100,000 p.s.i. in shear, 165,000 p.s.i. in bending, and 165,000 p.s.i. in edgewise compression.

Although panel constructions as described have been used before, such panels have generally been fabricated of aluminum. In aircraft designed to fly at speeds of Mach 3 and above it is necessary to employ a metal or metals capable of withstanding very high temperatures. It is generally agreed that stainless steel and titanium presents the most favorable combination of characteristics for use in high speed aircraft panels.

The evolution of a brazing alloy or alloys for use with titanium sandwich panel structures involves numerous problems, some of which are common to all types of brazing and others that are peculiar to titanium. Among the former are included the development of precise methods and tools for machining the core material, assembling the panel components, brazing the components, and inspecting the finished panels. The most notable of the latter problems is the compatability of the brazing alloy with titanium. In connecting with this problem the formation of intermetallic compounds or low melting eutectics with titanium must be considered. The amount of penetration or diffusion is also of great importance, especially when one of the members being brazed is only a few thousandths of an inch thick, as is the case with sandwich panel structures. The beta transus of titanium alloys, in some instances, acts as a temperature limit in consideration of brazing alloy, as it is a recognized fact that this temperature cannot be exceeded without seriously impairing the mechanical properties of the titanium. Another factor, of which little is known, but which must be considered, is the effect of the brazing alloy on the mechanical properties of titanium.

In brazing of titanium and stainless steel sandwich panel structures it is, therefore, necessary to provide a brazing alloy or alloys having the proper combination of brazing properties, service properties and high temperature strength. The necessary brazing properties include good flow, wetting and filleting characteristics, good corrosion resistance, satisfactory joint strength between −100 and 900° F., and a braze temperature below the beta transus temperature. It is also desirable that a metallurgical bond, as opposed to an adhesive bond, be effected between the skins and core material, as the former results in better mechanical properties of the panel. Another requirement, which in some instances may be very important, as when the aircraft on which the panel is to be installed will be based near a body of salt water, is that the brazed joints must resist the corrosive action of a salt bearing atmosphere without undergoing joint strength deterioration. In the brazing of a curved or wedge-shaped panel the fluidity of the brazing alloy at the brazing temperature is quite critical, in that the alloy must have sufficient fluidity to form high quality joints, without having excessive fluidity so that it tends to flow to and collect at the lowest point of the panel.

Heretofore several types of brazing compounds have been used. Nickel-base alloys had good shear strength at room and elevated temperatures but most of the alloying elements used to reduce the melting point of the alloys had adverse effect on the metals being brazed. Alloys containing phosphorus form brittle iron phosphides with the base metal, causing lowered joint strength. Alloys containing appreciable quantities of manganese, silicon or boron dissolved the base metal. Among the various silver-base alloys containing high percentages of copper (28 to 85%), wetting action was low except for those modified with 0.5% lithium. The addition to the silver-copper eutectic improved the wetting action considerably but also increased its already-high fluidity (due to its narrow melting range) to the extent that filleting was inadequate. Fine-silver-plus-lithium had good wetting and brazing characteristics but its mechanical strength was low especially at elevated temperature, and it had poor resistance to salt spray corrosion and high temperature oxidation. A 98% silver 2% lithium composition provided a mechanical type bond with relatively low joint strength. Another disadvantage common to all the above alloys was an excessively high fluidity at brazing temperatures, a characteristic which precludes their use in the brazing of curved or wedge-shaped panels.

The present invention consists of a novel composition of brazing alloy consisting of aluminum, manganese and silver for brazing titanium parts, with lithium added for brazing stainless steel. Joints thus brazed are of greatly superior strength at room temperature which is almost wholly retained up to about 800° F. and are resistant to salt spray corrosion and high temperature oxidation for extended periods of time.

It is therefore an object of this invention to provide for a novel brazing composition which yields a metallurgical bond of improved strength at both room and elevated temperature.

Another object is the provision of an improved brazing compound which resists brazed joint deterioration under corrosive and oxidizing conditions.

Another object is the provision of a brazing compound which will produce clean, strong, corrosion and oxidation resistant, brazed joints using conventional brazing techniques.

A further object is to provide a brazing compound which, because of its favorable fluid characteristics at brazing temperature, is particularly adapted for use in brazing curved or wedge-shaped structural components.

Other features and objects will become more apparent to those skilled in the art upon consideration of the alloy composition and characteristics.

In brazing, the tendency of the alloys to oxidize and to react readily with atmospheric gases results in the formation of brittle intermetallic compounds at the interface which prevents adequate bonding. The presence of metal oxides at the interface between the solid metal to be brazed and the molten brazing metal prevents the desired wetting action.

It has been discovered that a composition of aluminum, manganese, and silver is very satisfactory as a brazing alloy for brazing titanium and titanium alloy parts when the ingredients are present in the composition in proportions within the following specified percentage by weight ranges:

| | Percent |
|---|---|
| Aluminum | 4–13 |
| Manganese | .05–.4 |
| Silver | 86.6–95.9 |

The aluminum in such an alloy serves to lower the brazing temperature and inhibits the flow of the alloy at the brazing temperature. The small amount of manganese present in the alloy acts as a catalyst serving to promote the metallurgical reaction between the aluminum in the brazing alloy and the titanium in the core and skin components, resulting in a much higher joint strength than is possible in its absence from the alloy. The silver serves as the base metal for the brazing alloy, having melting and flow temperatures which are compatible with titanium and stainless steel. In addition silver is highly resistant to corrosion and oxidation.

The brazing composition consisting of 4% to 13% aluminum, .05% to .4% manganese, and 86.6% to 95.9% silver may be modified by the addition of a small quantity of lithium which renders the alloy suitable for brazing stainless steel. Excellent wetting, node flow, and filleting, along with minimum skin flow results from the use of lithium in the alloy. Any amount up to .75% of lithium may be used.

The following examples are illustrative of typical alloys falling within the scope of this invention:

| | Percent Aluminum | Percent Manganese | Percent Lithium | Percent Silver |
|---|---|---|---|---|
| Alloy A | 11.5–13 | .1–.4 | | 86.6–95.9 |
| Alloy B | 4–6 | .1–.4 | | 93.6–95.9 |
| Alloy C | 4–6 | .1–.4 | .2–.75 | 93.6–95.9 |
| Alloy D | 11.5–13 | .1–.4 | .2–.75 | 86.6–88.4 |

The brazing temperature of both the Alloy A and Alloy D is about 1450° F.; and the brazing temperature of both Alloys B and C is 1650° F.

A suitable method for preparing the alloy of the present invention comprises heating a substantial portion of the amount of pure silver to be used to approximately 50° F. above its melting point in an inert atmosphere, for example, argon, and stirring into the silver a properly proportioned, powdered master alloy of aluminum and manganese. The addition of lithium is effected by enclosing the appropriate small amout of lithium in granular form, within an ingot fashioned from the rest of the silver and then placing the ingot into the molten silver. The lithium may be added either before or after the aluminum and manganese are added. When the constituents have been properly blended, the alloy is allowed to cool and is then cold-rolled into foil form which is subsequently used in brazed panes. In order to prevent the formation of lithium oxide on the C and D alloy compositions during storage, it has been found desirable to plate the foil with a thin layer of pure silver. A coat of strippable lacquer may also be applied to further prevent oxidation. Although it is generally desirable to use the foil form of the brazing alloy, it has also been proven feasible to use a powder form of the alloy.

Brazing operations are carried out in the usual manner by assembling the panel components (core, skins and brazing alloy sheets) in an assembly fixture and tack-welding such components together. The assembled components are then transferred to a brazing retort connected to which is a gas circulation system for circulating an inert gas, such as argon. This gas is circulated through the brazing retort during the brazing operation in order to prevent oxidation reactions. The brazing retort containing the panel is then placed in a furnace and heated to brazing temperature. For the A composition a temperature of 1450° maintained for 1 to 15 minutes is sufficient to yield high quality brazed joints, while in the case of the B complex a temperature of 1650° F. is required. The brazing time is dependent mainly upon the thickness of the parts to be brazed, since diffusion and penetration of the brazing alloy into the part material are proportional to brazing time. After the brazing operation is completed the brazing retort and panel are removed from the furnace and allowed to cool to at least 500° F. before being exposed to air.

After brazing, each sandwich panel is inspected. In addition to dimensional and contour checks, the post-braze inspection consists of checking the heat-treat condition of the skin as well as the quality and completeness of the braze. The heat treatment is checked by tensile tests of test coupons run with each panel. Completeness of the braze is checked by radiographing each panel. The strength of the braze is tested by flash-heating, whereby thermal stresses exert a compressive stress on the core and tensile stress on the joint. The localized thermal stresses rupture weak brazing connections immediately. This can then be readily detected and repaired before the panel passes inspection.

Although certain examples of compositions have been disclosed hereinabove, it is to be understood that other compositions falling within the scope of our invention may be made and will give equally satisfactory results.

What we claim is:

1. A brazing alloy composition consisting of 4% to 13% by weight of aluminum, .05% to .4% by weight of manganese, .2% to .75% by weight of lithium, and 86.6% to 95.9% by weight of silver.

2. A brazing alloy composition consisting of 4% to 6% by weight of aluminum, .1% to .4% by weight of manganese, .2% to .75% by weight of lithium, and 93.6% to 95.9% by weight of silver.

3. A brazing alloy composition consisting of 11.5% to 13% by weight of aluminum, .1% to .4% by weight of manganese, .2% to .75% by weight of lithium, and 86.6% to 88.4% by weight of silver.

References Cited by the Examiner

UNITED STATES PATENTS

| 1,863,645 | 6/32 | Assmann | 75—173 |
| 2,805,155 | 9/57 | Gelb et al. | 75—173 |

DAVID L. RECK, *Primary Examiner.*

RAY K. WINDHAM, *Examiner.*